United States Patent
Reed et al.

(10) Patent No.: US 8,423,573 B2
(45) Date of Patent: Apr. 16, 2013

(54) FILESYSTEM BACKUP USING DIRECTORYWISE HARDLINKING FOR A COMPUTER FILESYSTEM

(75) Inventors: Benjamin C. Reed, Morgan Hill, CA (US); Mark A. Smith, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 1805 days.

(21) Appl. No.: 10/904,488

(22) Filed: Nov. 12, 2004

(65) Prior Publication Data

US 2006/0106818 A1 May 18, 2006

(51) Int. Cl.
*G06F 17/00* (2006.01)
(52) U.S. Cl.
USPC ............ 707/791; 707/802; 707/822; 707/828
(58) Field of Classification Search ................... 707/204, 707/600–899; 711/216; 395/600
See application file for complete search history.

(56) References Cited

U.S. PATENT DOCUMENTS

| | | | |
|---|---|---|---|
| 5,457,796 A * | 10/1995 | Thompson | 707/203 |
| 6,327,703 B1 * | 12/2001 | O'Donnell et al. | 717/162 |
| 6,381,615 B2 * | 4/2002 | Gaither et al. | 707/200 |
| 6,952,699 B2 * | 10/2005 | O'Connell et al. | 707/10 |
| 2003/0018878 A1 * | 1/2003 | Dorward et al. | 711/216 |

* cited by examiner

*Primary Examiner* — Isaac M Woo
(74) *Attorney, Agent, or Firm* — Lieberman & Brandsdorfer, LLC

(57) ABSTRACT

The present invention provides a method and system of performing a current filesystem backup with respect to a previous filesystem backup using directorywise hardlinking for a computer filesystem. In an exemplary embodiment, the method and system include (1) identifying all largest unchanged subtrees in the previous filesystem backup with respect to a current computer filesystem and (2) creating directorywise hardlinks in the current filesystem backup to the all largest unchanged subtrees. In an exemplary embodiment, the creating includes for each of the largest unchanged subtrees, forming a first pointer from the current filesystem backup to the each of the largest unchanged subtrees. In a further embodiment, the creating includes for each of the largest unchanged subtrees, establishing a second pointer from the each of the largest unchanged subtrees to a directory in the current filesystem backup that corresponds to the first pointer.

8 Claims, 7 Drawing Sheets

FILESYSTEM BACKUP USING DIRECTORYWISE HARDLINKING FOR A COMPUTER FILESYSTEM

FIELD OF THE INVENTION

Figure 1A:
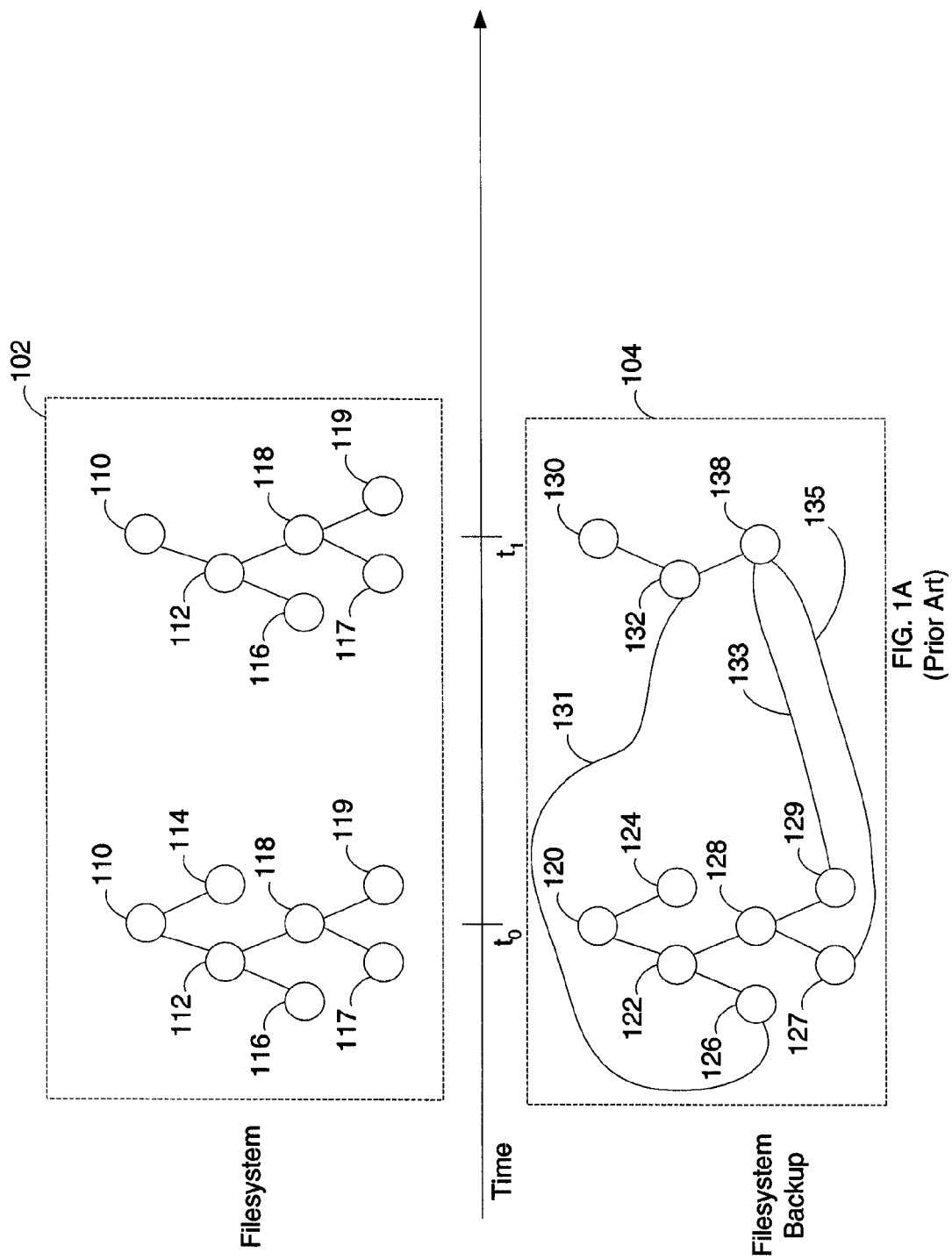

The present invention relates to computer filesystems, and particularly relates to a method and system of performing a current filesystem backup with respect to a previous filesystem backup using directorywise hardlinking for a computer filesystem.

BACKGROUND OF THE INVENTION

Filewise backup applications need two features which until now have been mutually exclusive. First, for the base filesystem backup (i.e. base backup) and all of the incremental filesystem backups (i.e. incremental backups), being able to present a full mirror image of each backup individually is desired. At the time of the incremental backup, the incremental backup is a current filesystem backup. Second, being able to conserve space on the backup media (a) by not creating duplicate directory structures for each backup and (b) by not storing duplicate files more than once, is also desired. These two features continue to be mutually exclusive in prior art filewise backup applications.

PRIOR ART SYSTEMS

Currently, filewise backup applications take one of three approaches to try to get around these problems.
Filewise Hardlinks In the first prior art approach, as shown in prior art FIG. 1A, the backup application uses filewise hardlinks (e.g. filewise hardlinks 131, 133, and 135) inside of the backups to point to files which have not changed between backups (i.e. unchanged files between backups). This approach (a) fulfills the first requirement of presenting a full mirror image of each backup to the user and (b) also prevents duplicate files from being stored on the backup media. However, this first approach still requires a duplicate directory tree to be created to house the filewise hardlinks, thereby wasting space on the backup media and failing to meet the second requirement. The first approach creates filewise hardlinks only to unchanged file "leaves". For example, given a filesystem 102 at time t0 consisting of filesystem nodes 110, 112, 114, 116, 118, 117, and 119, a backup application creates a filesystem backup 104 at time t0 consisting of filesystem backup nodes 120, 122, 124, 126, 128, 127, and 129, where filesystem backup nodes 120, 122, 124, 126, 128, 127, and 129, correspond to filesystem nodes 110, 112, 114, 116, 118, 117, and 119 at time t0. At time t1, the first prior art system creates filesystem backup nodes 130, 132, and 138 that correspond to filesystem nodes 110, 112, and 118 at time t1. In addition, at time t1, the first prior art system creates filewise hardlink 131 from filesystem backup node 132 to unchanged filesystem backup node 126 (where filesystem backup node 126 is an unchanged file or "leaf") and filewise hardlinks 133 and 135 from filesystem backup node 138 to unchanged filesystem backup nodes 127 and 129, respectively (where filesystem backup nodes 127 and 29 are unchanged files or "leaves").
Not Copy Duplicates In the second prior art approach, as shown in prior art FIG. 1B, the backup application does not copy files, directory tree files, and directories which are duplicates in the base and incremental backups. Instead, the backup application stores metadata (i.e. metadata 140) relating the incremental backup (i.e. incremental backup 104) to its base or reference backup. Thus, this approach satisfies the second requirement by conserving space on the backup media. However, this second approach does not present a full mirror image of all the backups to the user, thereby failing to satisfy the first requirement.

For example, given a filesystem 102 at time t0 consisting of filesystem nodes 110, 112, 114, 116, 118, 117, and 119, a backup application creates a filesystem backup 104 at time t0 consisting of filesystem backup nodes 120, 122, 124, 126, 128, 127, and 129, where filesystem backup nodes 120, 122, 124, 126, 128, 127, and 129, correspond to filesystem nodes 110, 112, 114, 116, 118, 117, and 119 at time t0. At time t1, the second prior art system creates a new nodes metadata 142 that lists the filesystem nodes that have been added to the filesystem at time t1. In addition, at time t1, the second prior art system creates a deleted nodes metadata 144 that lists the filesystem nodes that have been deleted from the filesystem at time t1. The new nodes metadata and deleted nodes metadata list their respective nodes by the root node in the filesystem (e.g. filesystem node 110) and the subsequent children of the root node that lead to and include the added or deleted node, respectively.
Hybrid In the third prior art approach, as shown in prior art FIG. 1C, the backup application (a) performs a hybrid between the first two prior art approaches and (b) then displays the base backup and all of the incremental backups as full mirror images in a view 106. This approach system achieves the two requirements of filewise backup applications. However, this third approach requires a substantial investment in an application to rearrange the base backup and all of the incremental backups for viewing and a user interface to display the base backup and all of the incremental backups.

For example, given a filesystem 102 at time t0 consisting of filesystem nodes 110, 112, 114, 116, 118, 117, and 119, a backup application creates a filesystem backup 104 at time t0 consisting of filesystem backup nodes 120, 122, 124, 126, 128, 127, and 129, where filesystem backup nodes 120, 122, 124, 126, 128, 127, and 129, correspond to filesystem nodes 110, 112, 114, 116, 118, 117, and 119 at time t0. At time t1, the third prior art system creates a new nodes metadata 142 that lists the filesystem nodes that have been added to the filesystem at time t1. In addition, at time t1, the third prior art system creates a deleted nodes metadata 144 that lists the filesystem nodes that have been deleted from the filesystem at time t1. The new nodes metadata and deleted nodes metadata list their respective nodes by the root node in the filesystem (e.g. filesystem node 110) and the subsequent children of the root node that lead to and include the added or deleted node, respectively.

In addition, at time t1, the third prior art system (a) displays the filesystem at time t0 as displayed filesystem nodes 150, 152, 154, 156, 158, 157, and 159, that correspond to filesystem nodes 110, 112, 114, 116, 118, 117, and 119, respectively and (b) displays the filesystem backup at time t1 as displayed filesystem backup nodes 160, 162, 166, 168, 167, and 169, that correspond to filesystem backup nodes 130, 132, 126, 138, 127, and 129, respectively inside view 106.
Directorywise Softlinking Directorywise softlinking creates an indirect reference (i.e. a directorywise softlink) to an existing directory on the filesystem. However, directorywise softlinking does not prevent the deletion of the softlinked directory in question. If the existing directory were deleted, the softlinked directory reference (i.e. the directorywise softlink) would become invalid.
Directorywise Hardlinking Directorywise hardlinking creates a direct reference to an existing directory on the filesystem. Directorywise hardlinking prevents the deletion of a hardlinked directory from its other parents. Directorywise hardlinking is well known. However, directorywise hardlinking has been sparsely used in very limited circumstances because no practical use for it has been conceived.

Therefore, a method and system of performing a current filesystem backup with respect to a previous filesystem backup using directorywise hardlinking for a computer filesystem is needed.

SUMMARY OF THE INVENTION

The present invention provides a method and system of performing a current filesystem backup with respect to a previous filesystem backup using directorywise hardlinking for a computer filesystem. In an exemplary embodiment, the method and system include (1) identifying all largest unchanged subtrees in the previous filesystem backup with respect to a current computer filesystem and (2) creating directorywise hardlinks in the current filesystem backup to the all largest unchanged subtrees.

In an exemplary embodiment, the creating includes for each of the largest unchanged subtrees, forming a forward pointer from the current filesystem backup to the each of the largest unchanged subtrees. In a further embodiment, the creating includes for each of the largest unchanged subtrees, establishing a back pointer from the each of the largest unchanged subtrees to a directory in the current filesystem backup that corresponds to the first pointer.

The present invention also provides a system of performing a current filesystem backup with respect to a previous filesystem backup using directorywise hardlinking for a computer filesystem. In an exemplary embodiment, the system includes (1) an identifying module configured to identify all largest unchanged subtrees in the previous filesystem backup with respect to a current computer filesystem and (2) a creating module configured to create directorywise hardlinks in the current filesystem backup to the all largest unchanged subtrees.

The present invention also provides a computer program product usable with a programmable computer having readable program code embodied therein of performing a current filesystem backup with respect to a previous filesystem backup using directorywise hardlinking for a computer filesystem. In an exemplary embodiment, the computer program product includes (1) computer readable code for identifying all largest unchanged subtrees in the previous filesystem backup with respect to a current computer filesystem and (2) computer readable code for creating directorywise hardlinks in the current filesystem backup to the all largest unchanged subtrees.

The present invention also provides a method of providing a service to perform a current filesystem backup with respect to a previous filesystem backup using directorywise hardlinking for a computer filesystem. In an exemplary embodiment, the method includes (1) identifying all largest unchanged subtrees in the previous filesystem backup with respect to a current computer filesystem and (2) creating directorywise hardlinks in the current filesystem backup to the all largest unchanged subtrees.

THE FIGURES

Figure 1B:
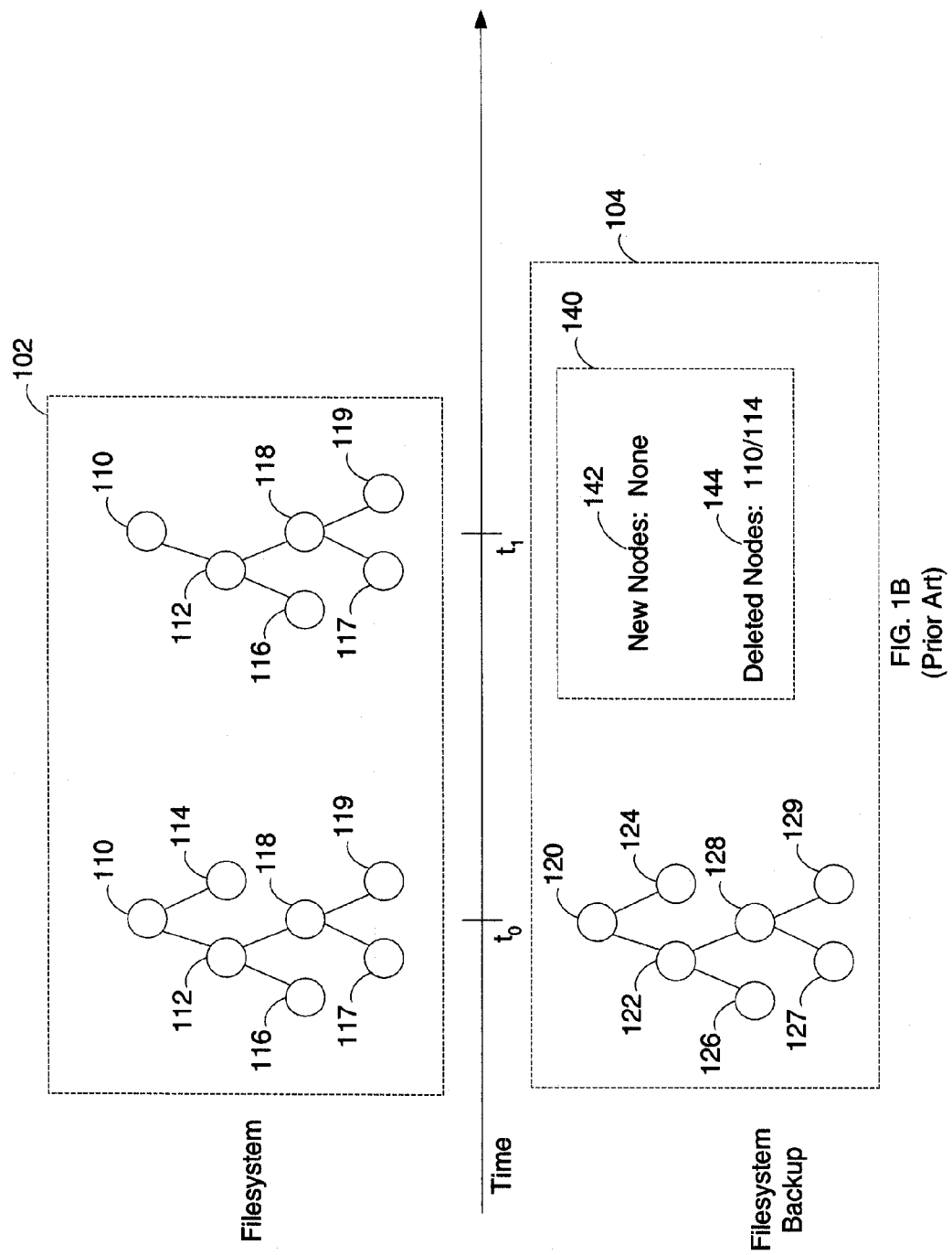
Figure 1C:
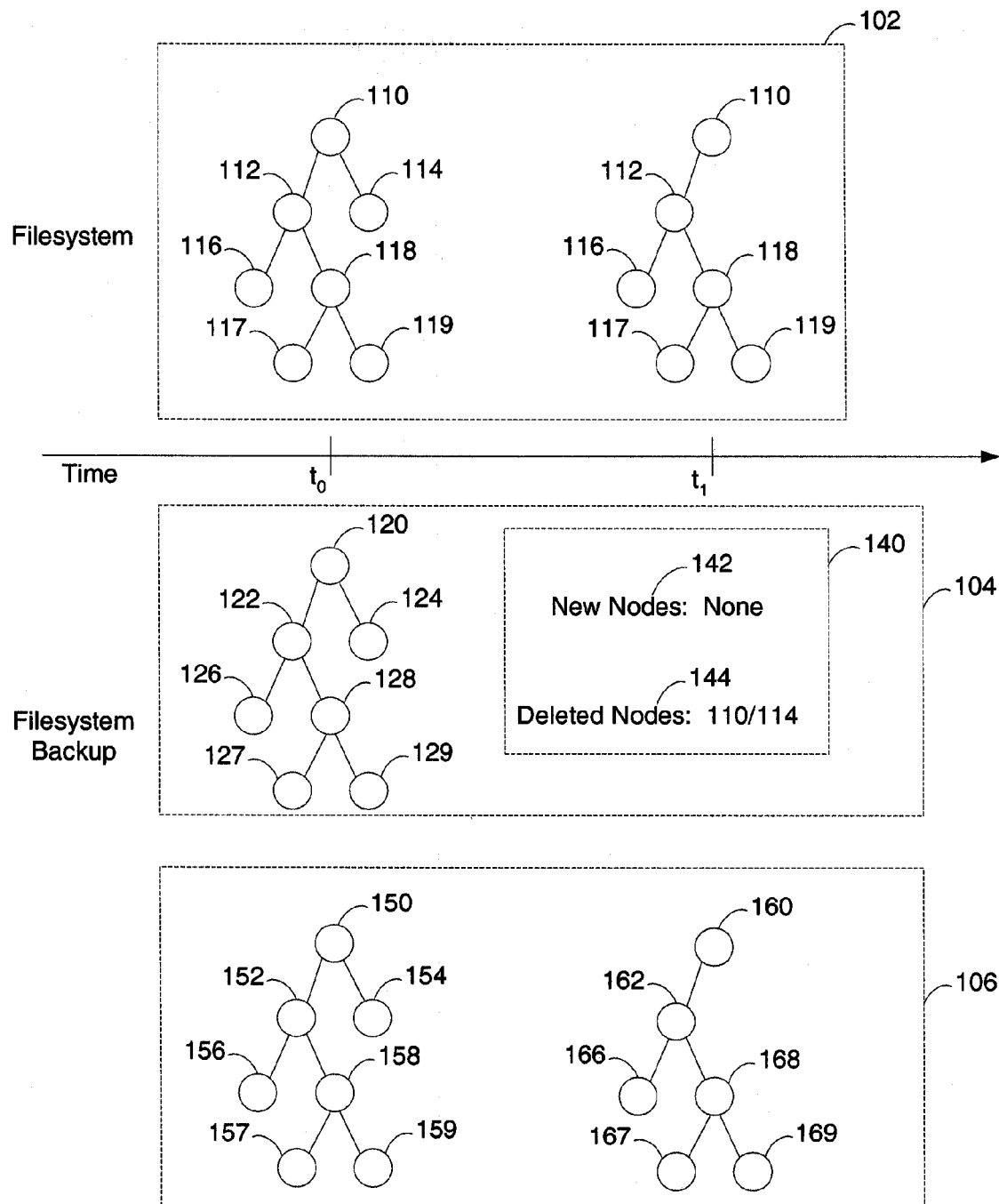
Figure 2:
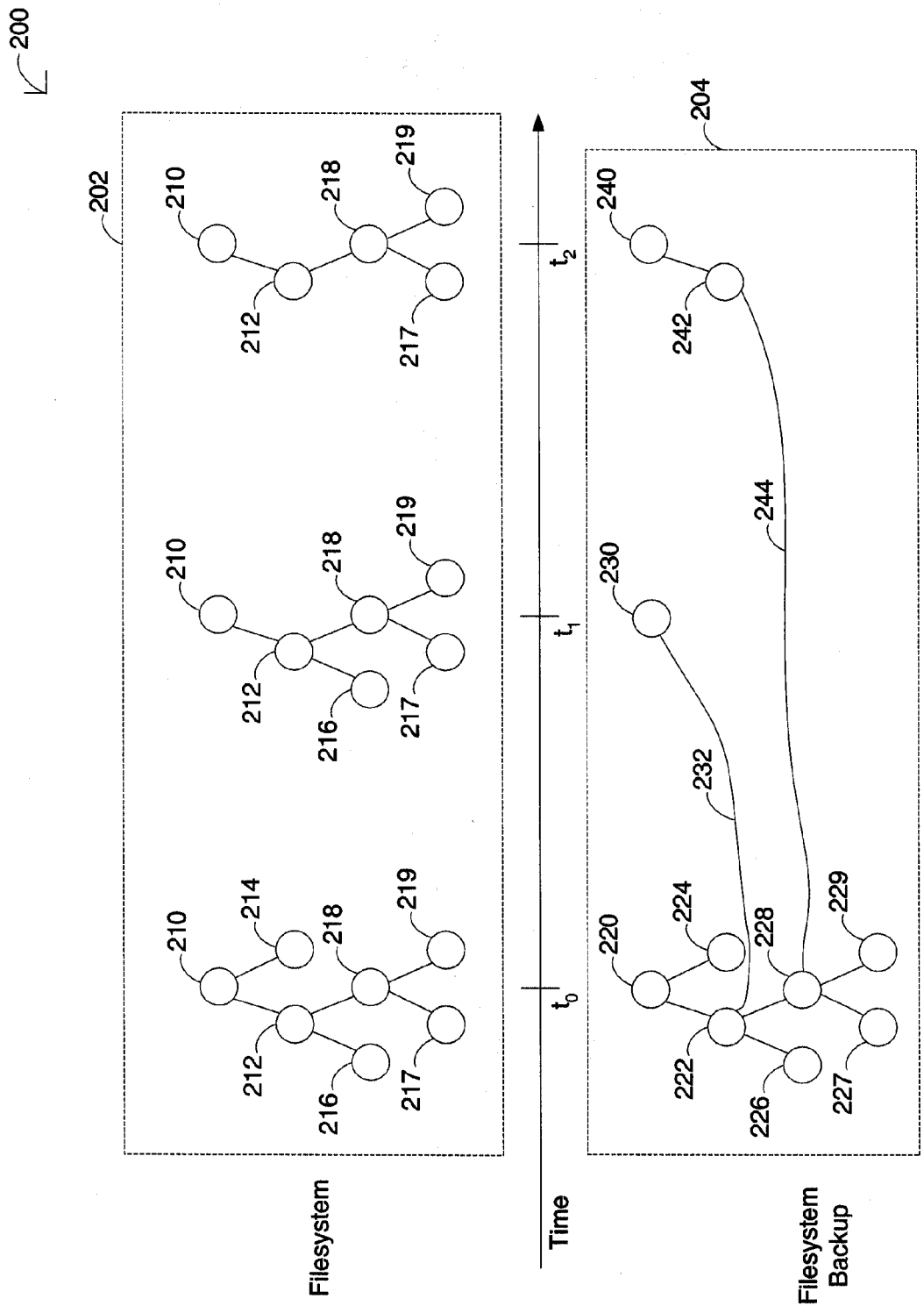
Figure 3:
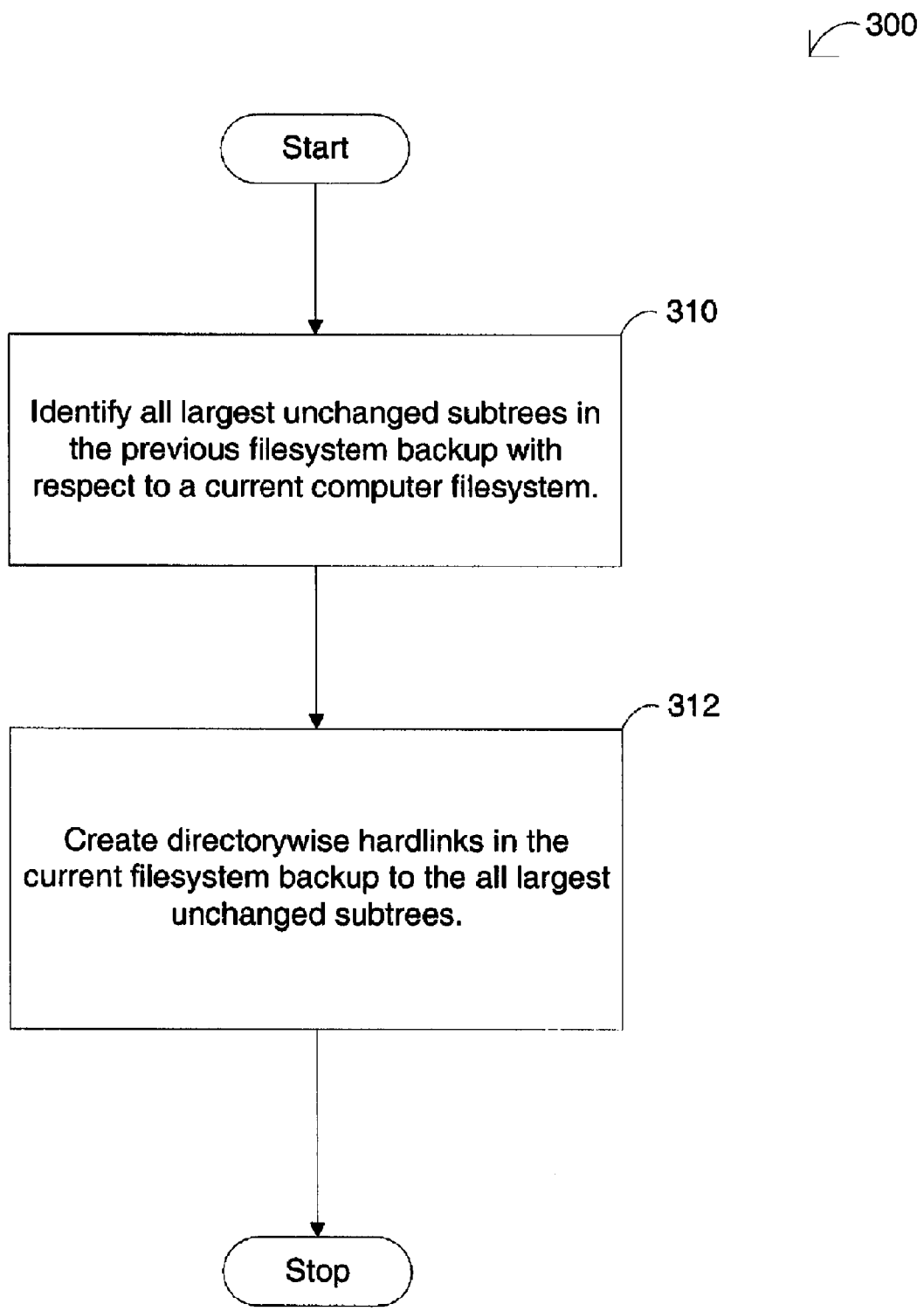
Figure 4A:
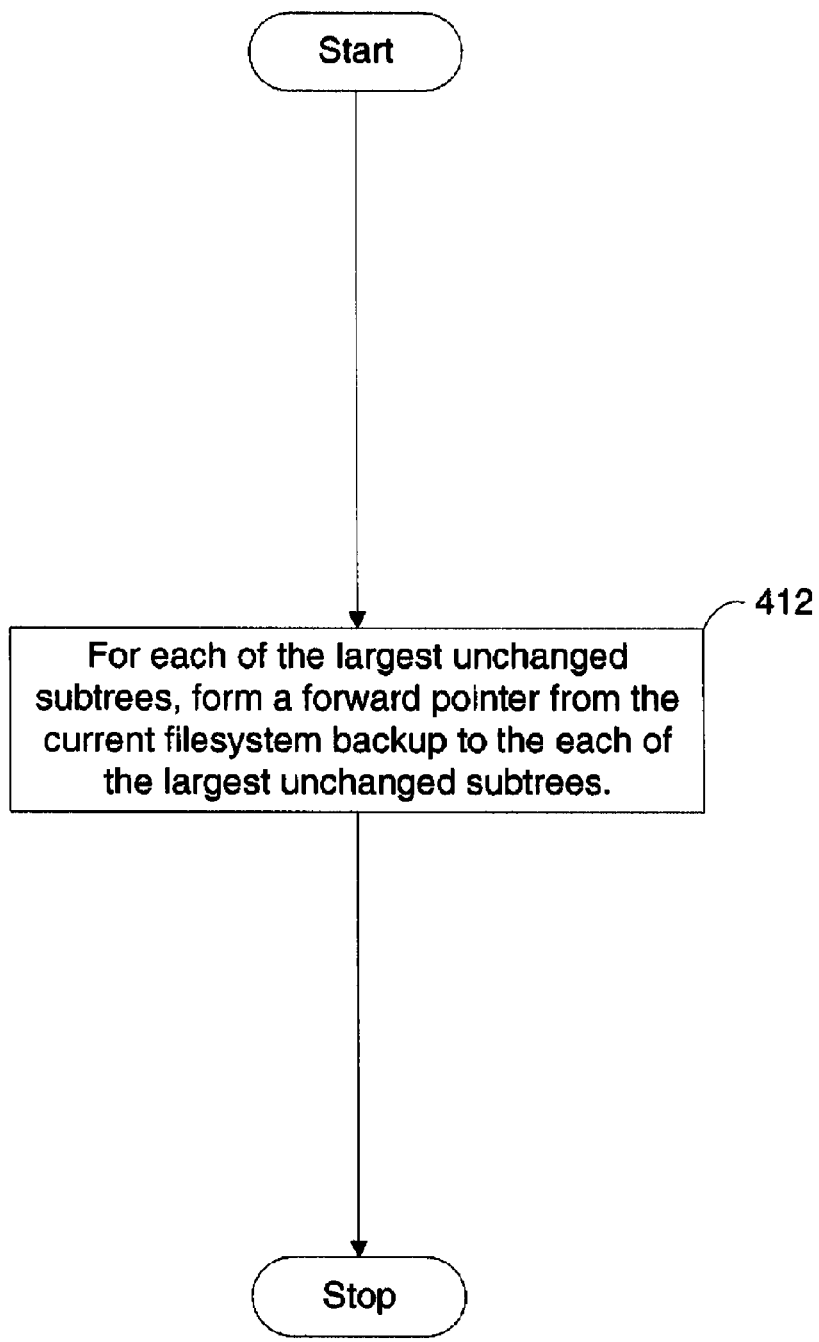
Figure 4B:
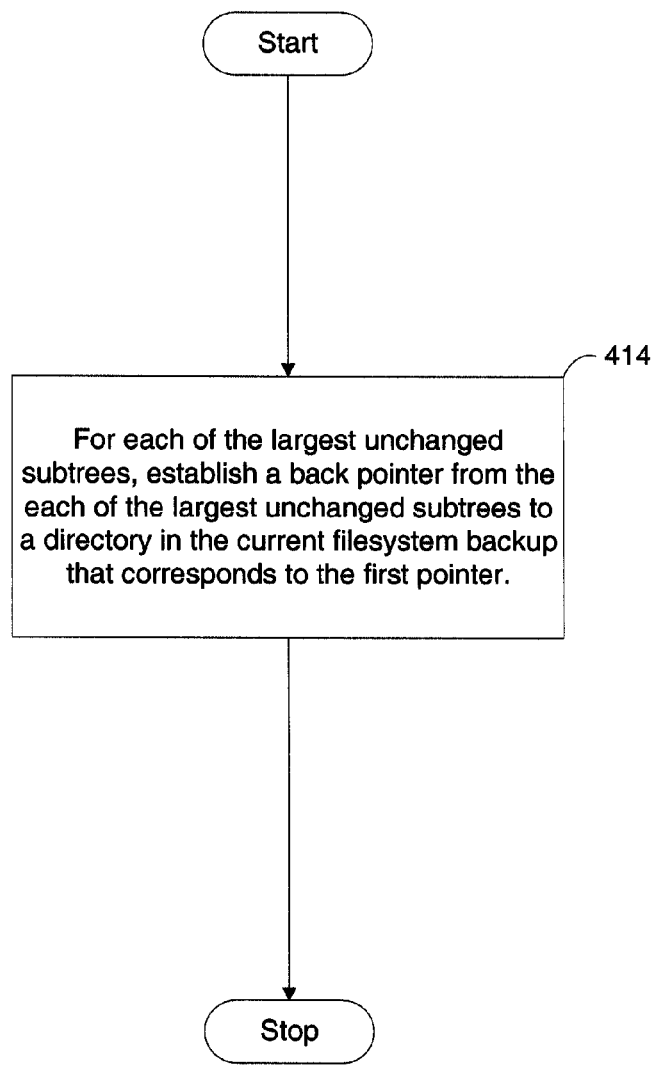

FIG. 1A is a flowchart of a prior art technique.
FIG. 1B is a flowchart of a prior art technique.
FIG. 1C is a flowchart of a prior art technique.
FIG. 2 is a block diagram in accordance with an exemplary embodiment of the present invention.
FIG. 3 is a flowchart in accordance with an exemplary embodiment of the present invention.
FIG. 4A is a flowchart of the forming step in accordance with an exemplary embodiment of the present invention.
FIG. 4B is a flowchart of the establishing step in accordance with a further embodiment of the present invention.

DETAILED DESCRIPTION OF THE INVENTION

The present invention provides method and system of performing a current filesystem backup with respect to a previous filesystem backup using directorywise hardlinking for a computer filesystem (i.e. a filesystem). In an exemplary embodiment, the method and system include (1) identifying all largest unchanged subtrees in the previous filesystem backup with respect to a current computer filesystem and (2) creating directorywise hardlinks in the current filesystem backup to the all largest unchanged subtrees.

Referring to FIG. 2, in an exemplary embodiment, the present invention works with a computer filesystem 202 (i.e. filesystem 202) and a filesystem backup 204 at different times. Referring to FIG. 2, in an exemplary embodiment, the present invention, at time t1 identifies all largest unchanged subtrees in the previous filesystem backup at time t0 (where the previous filesystem backup at time t0 consists of filesystem backup nodes 220, 222, 224, 226, 228, 227, and 229) with respect to a current filesystem at time t1 (where the current filesystem backup at time t1 consists of filesystem nodes 210, 212, 216, 218, 217, and 219). For example, as shown in FIG. 2, at time t1, the present invention identifies only the subtree consisting of filesystem backup nodes 222, 226, 228, 227, and 229, as all largest unchanged subtrees in the previous filesystem backup at time t0 with respect to the current filesystem at time t1.

In an exemplary embodiment, the present invention, at time t1 creates directorywise hardlinks in the current filesystem backup at time t1, where the current filesystem backup at time t1 includes a filesystem backup node 230 that corresponds to filesystem node 210 at time t1, to the all largest unchanged subtrees in the previous filesystem backup at time t0. For example, as shown in FIG. 2, the present invention, at time t1 creates a directorywise hardlink 232 in the current filesystem backup at time t1 (consisting of filesystem backup node 230) to the all largest unchanged subtrees in the previous filesystem backup at time t0. Specifically, the present invention creates directorywise hardlink 232 from filesystem backup node 230 to filesystem backup node 222. In an exemplary embodiment, the previous filesystem backup at time to is a base backup. In an exemplary embodiment, the current filesystem backup at time t1 is an incremental backup. In a specific embodiment, the current filesystem backup at time t1 is a first incremental backup.

Further referring to FIG. 2, in an exemplary embodiment, the present invention, at time t2 identifies all largest unchanged subtrees in the previous filesystem backup at time t1 (where the previous filesystem backup at time t1 consists of filesystem backup nodes 230, 222, 226, 228, 227, and 229) with respect to a current filesystem at time t2 (where the current filesystem at time t2 consists of filesystem nodes 210, 212, 218, 217, and 219). For example, as shown in FIG. 2, at time t2, the present invention identifies only the subtree consisting of filesystem backup nodes 228, 227, and 229, as all largest unchanged subtrees in the previous filesystem backup at time t1 with respect to the current filesystem at time t2.

In an exemplary embodiment, the present invention, at time t2 creates directorywise hardlinks in the current filesystem backup at time t2 (where the current filesystem backup at time t2 includes a filesystem backup node 240 that corresponds to filesystem node 210 at time t2 and a filesystem backup node 242 that corresponds to filesystem node 212 at time t2) to the all largest unchanged subtrees in the previous filesystem backup at time t1. For example, as shown in FIG. 2, the present invention, at time t2 creates a directorywise hardlink 244 in the current filesystem backup at time t2 (consisting of filesystem backup nodes 240 and 242) to the all largest unchanged subtrees in the previous filesystem backup at time t1. Specifically, the present invention creates directorywise hardlink 244 from filesystem backup node 242 to filesystem backup node 228. In an exemplary embodiment, the previous filesystem backup at time t1 is a first incremental backup. In an exemplary embodiment, the current filesystem backup at time t2 is an incremental backup. In a specific embodiment, the current filesystem backup at time t2 is a second incremental backup.

Referring to FIG. 3, in an exemplary embodiment, the present invention includes a step 310 of identifying all largest unchanged subtrees in the previous filesystem backup with respect to a current computer filesystem and a step 312 of creating directorywise hardlinks in the current filesystem backup to the all largest unchanged subtrees.

Referring to FIG. 4A, in an exemplary embodiment, creating step 312 includes a step 412 of for each of the largest unchanged subtrees, forming a forward pointer from the current filesystem backup to the each of the largest unchanged subtrees. In a further embodiment, referring to FIG. 4B, creating step 312 further includes a step 414 of for each of the largest unchanged subtrees, establishing a back pointer from the each of the largest unchanged subtrees to a directory in the current filesystem backup that corresponds to the first pointer.

General

The present invention uses directorywise hardlinks (e.g. directorywise hardlinks 232 and 244) to directly link to subtrees in filesystem backups with identical structure and files. The present invention thereby saves backup media space by not having to reproduce the directory tree a filesystem on the backup media. Also, the present invention presents all of the filesystem backups of a filesystem as full mirror images of the filesystem as it changes. The present invention (1) creates full mirror images of all filesystem backups (i.e. filesystem backup versions), (2) saves space on the backup media, and (3) does not require an investment in a complex user interface to display all of the filesystem backups. All of this functionality is achieved in the underlying use of directorywise hardlinks in the filesystem backups.

The present invention enables a filesystem backup which requires minimal storage and gives the user maximal simplicity when viewing archived filesystem backups (i.e. full mirror images of all archived filesystem backups). The present invention presents all filesystem backups as full mirror images of the filesystem. Also, the present invention does not require a specialized backup viewer to achieve these goals.

Create Hardlinks

The present invention allows for the creation of filesystem backup directories which directly reference other filesystem backup directories already in the filesystem backup via directorywise hardlinks. Unlike directorywise softlinking, the present invention establishes a connection (i.e. a directorywise hardlink) to an existing filesystem backup directory, thereby preventing that filesystem backup directory from being deleted. In directorywise hardlinked filesystem backup directories, an attempted deletion of the target filesystem backup directory does not delete the target filesystem backup directory until all directorywise hardlinks to the filesystem backup directory have been deleted. The present invention allows for the creation of directorywise hardlinks between identical pieces of both base and incremental backups in order to save space on the backup media.

Full Mirror Images

In addition, the present invention presents full mirror images of all filesystem backups of a filesystem. During a backup, the present invention traverses the filesystem as well as all existing filesystem backups of the filesystem. During this traversal, when the present invention discovers subtrees of the filesystem backup which have not changed with respect to the filesystem, it creates a directorywise hardlink in the current filesystem backup to the unchanged subtree in the previous filesystem backup which has already saved this data. The present invention does this discovering and creating on all subtrees in the filesystem and in the filesystem backups.

CONCLUSION

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A method for performing a filesystem backup, the method comprising:
   representing the filesystem as a hierarchical tree structure, the tree structure including multiple nodes representing files and directories;
   performing a base backup of the file system at a first point in time, the base backup having the same tree structure as the file system;
   identifying all largest unchanged subtrees within a tree structure of the base backup with respect to a tree structure of the filesystem at a second point in time;
   at the second point in time, performing an incremental backup consisting of: creating directorywise hardlinks, the hardlinks limited to the all largest unchanged subtrees in the base backup, wherein the tree structure of the filesystem at the second point in time consists of: nodes representing changed directories.

2. The method of claim 1 wherein the creating comprises for each of the largest unchanged subtrees, forming a forward pointer from a current filesystem backup to the each of the largest unchanged subtrees in the base backup.

3. The method of claim 2 further comprising for each of the largest unchanged subtrees, establishing a back pointer from the each of the largest unchanged subtrees to a directory in the current filesystem backup that corresponds to the first pointer.

4. A method of performing a filesystem backup, the method comprising:
   representing the filesystem as a hierarchical tree structure, the tree structure including multiple nodes representing files and directories;
   performing a base backup of a file system at a first point in time, the base backup having the same tree structure as the file system;
   identifying all largest unchanged subtrees within a tree structure of the base backup with respect to a tree structure of the filesystem at a second point in time; and
   at the second point in time performing an incremental filesystem backup consisting of: creating directorywise hardlinks, the hardlinks limited to the all largest unchanged subtrees in the base backup, wherein the tree structure of the filesystem at the second point in time consisting of: of nodes representing changed directories, wherein the creating comprises:

for each of the largest unchanged subtrees, forming a forward pointer from the incremental filesystem backup to each of the largest unchanged subtrees, and for each of the largest unchanged subtrees, establishing a back pointer from the each of the largest unchanged subtrees to a directory in the incremental filesystem backup that corresponds to the first pointer.

5. A computer program product usable with a programmable computer having readable program code embodied therein of performing a filesystem backup, the computer program product comprising:

computer readable code for representing the filesystem as a hierarchical tree structure, the tree structure including multiple nodes representing files and directories;

computer readable code for performing a base backup of the file system at a first point in time, the base backup having a same tree structure as the file system;

computer readable code for identifying all largest unchanged subtrees within a tree structure of the base filesystem backup with respect to a tree structure of the filesystem at a second point in time; and computer readable code for performing an incremental filesystem backup by creating directorywise hardlinks without creating file hardlinks, the hardlinks limited to the all largest unchanged subtrees in the base backup at the second point in time, wherein the tree structure of the filesystem at the second point in time consists of: nodes representing changed directories and absent nodes representing unchanged directories and files within the changed directories.

6. The computer program product of claim 5 wherein the computer readable code for creating comprises for each of the largest unchanged subtrees, computer readable code for forming a forward pointer from a current filesystem backup to the each of the largest unchanged subtrees in the base backup.

7. The computer program product of claim 6 further comprising for each of the largest unchanged subtrees, computer readable code for establishing a back pointer from the each of the largest unchanged subtrees to a directory in the current filesystem backup that corresponds to the first pointer.

8. A computer program product usable with a programmable computer having readable program code embodied therein of performing a filesystem backup, the computer program product comprising:

computer readable code for representing the filesystem as a hierarchical tree structure, the tree structure including multiple nodes representing files and directories;

computer readable code for performing a base backup of a file system at a first point in time, the base backup having a same tree structure as the filesystem;

computer readable code for identifying all largest unchanged subtrees within a tree structure of the base backup with respect to a tree structure of the filesystem at a second point in time; and computer readable code for performing an incremental filesystem backup by creating directorywise hardlinks and absent creating file hardlinks, the hardlinks limited in to the all largest unchanged subtrees in the base backup at the second point in time, wherein the tree structure of the filesystem at the second point in time consists of: nodes representing changed directories, wherein the creating comprises:

for each of the largest unchanged subtrees, forming a forward pointer from the incremental filesystem backup to each of the largest unchanged subtree, and for each of the largest unchanged subtrees, establishing a back pointer from the each of the largest unchanged subtree to a directory in the incremental filesystem backup that corresponds to the first pointer.

* * * * *